United States Patent [19]
McMahon

[11] Patent Number: 6,037,954
[45] Date of Patent: Mar. 14, 2000

[54] PORTABLE HAND-HELD READING DEVICE

[76] Inventor: M. James McMahon, 41-2450 Lancaster Road, Ottawa, Ontario, Canada, K1B 5N3

[21] Appl. No.: 08/899,158

[22] Filed: Jul. 23, 1997

[51] Int. Cl.[7] .................................................. G06F 3/14
[52] U.S. Cl. ...................... 345/901; 345/905; 345/169; 348/687; 361/681
[58] Field of Search .................... 345/901, 902, 345/903, 904, 905, 169; 348/687; 361/679, 680, 681, 682

[56] References Cited

U.S. PATENT DOCUMENTS

| | | | |
|---|---|---|---|
| 4,159,417 | 6/1979 | Rubincam . | |
| 4,160,242 | 7/1979 | Fowler . | |
| 5,270,818 | 12/1993 | Ottenstein | 348/602 |
| 5,283,862 | 2/1994 | Lund | 345/173 |
| 5,339,091 | 8/1994 | Yamazaki et al. . | |
| 5,339,901 | 8/1994 | Yamazaki et al. | 345/104 |
| 5,438,344 | 8/1995 | Oliva | 345/507 |
| 5,467,102 | 11/1995 | Kuno et al. . | |
| 5,475,398 | 12/1995 | Yamazaki et al. | 345/104 |
| 5,475,399 | 12/1995 | Borsuk | 345/901 |
| 5,534,888 | 7/1996 | Lebby et al. | 345/901 |
| 5,564,078 | 10/1996 | Nagai | 455/575 |
| 5,703,624 | 12/1997 | Van Kruistum | 345/901 |
| 5,761,485 | 6/1998 | Munyan | 345/901 |

*Primary Examiner*—Bipin Shalwala
*Assistant Examiner*—Vincent E. Kovalick
*Attorney, Agent, or Firm*—Sughrue, Mion, Zinn, Macpeak & Seas, PLLC

[57] ABSTRACT

An easily portable electronic book reading device for reading text information of documents, books etc. previously stored on a storage medium. The device generally comprises a flat screen monitor, a control panel, and a data storage/reading device. The flat screen monitor displays text information of a document being read, and optionally system control data. The control panel allows the user to control the display of information on the monitor, including selection of a document to be read; moving to a desired page; "bookmarking" a desired page to allow the user to rapidly return to that page at a later time; stepping forward and backward through a document one page at a time; and controlling the size of text displayed on the monitor. The data storage/reading device, which can conveniently be provided as a CD-ROM or (preferably) a Micro-CD-ROM is provided to read text information from a removable memory medium, for display on the monitor. The flat screen monitor, control panel, and data storage/reading device are housed within a housing designed to facilitate ease and comfort of the user over extended periods of use of the device, and further to effectively protect the various components from damage due to impacts or entry of foreign matter such as dust and sand.

12 Claims, 3 Drawing Sheets

PORTABLE HAND-HELD READING DEVICE

CROSS-REFERENCE TO RELATED APPLICATIONS

This is the first application filed for the present invention.

MICROFICHE APPENDIX

Not Applicable.

SUMMARY OF THE INVENTION

This invention relates to a portable hand-held reading device capable of displaying text information previously stored on a storage medium. Devices of this general nature are known in the art. For example, U.S. Pat. Nos. 4,159,417 (Rubincam), U.S. Pat. No. 5,339,091 (Yamazaki et al.), U.S. Pat. No. 5,438,344 (Oliva), U.S. Pat. No. 5,467,102 (Kuno et al.), U.S. Pat. No. 5,475,398 (Yamazaki et al), and U.S. Pat. No. 5,475,399 (Borsuk) teach portable reading devices. In each of the above patents, text information is stored on a suitable storage medium, such as, for example, a conventional Compact Disc (CD). A microprocessor controlled system reads text information from the storage medium and displays the information on a display screen to be read by a user.

An object of the present invention is to provide an easily portable hand-held reading device with improved ruggedness and usability features.

Accordingly, an aspect of the present invention provides an easily portable electronic book reading device for reading text information of documents, books etc. previously stored on a storage medium. The device generally comprises a display screen, a control panel, and a memory device. The display screen displays text information of a document being read, and optionally system control data. The control panel allows the user to control the display of information on the monitor, including selection of a document to be read; moving to a desired page; "book-marking" a desired page to allow the user to rapidly return to that page at a later time; stepping forward and backward through a document one page at a time; and controlling the size of text displayed on the monitor. The memory device, which can conveniently be provided as a CD-ROM or (preferably) a Micro-CD-ROM is provided to read text information from a removable memory medium, for display on the display screen. The display screen, control panel, and memory device are housed within a housing designed to facilitate ease and comfort of the user over extended periods of use of the device, and further to effectively protect the various components from damage due to impacts or entry of foreign matter such as dust and sand.

Preferably, the display screen is provided with brightness and illumination controls so that the user can adjust the brightness of the screen as desired.

An embodiment of the invention includes a cover plate which is removably provided on the control panel so that the user is prevented from inadvertently activating the control panel while they are carrying the device and or reading a document. The cover plate is preferably provided with a window which leaves one or more buttons of the control panel exposed when the cover plate is closed. For example, the window can be arranged to expose the "next page" (and optionally also the "previous page") button(s) exposed. This allows the user to easily step to the next (and/or previous) page in a document without having to open the cover plate to expose the entire control panel.

In an embodiment of the invention, the cover plate is arranged to cover the data storage/reading device. By this means the data storage/reading device can be protected from ingress of foreign matter, such as dust and sand, when the cover plate is closed.

At least a portion of the housing of the device is covered with a resilient shock and impact absorbing material that also forms gripping portions. The material offers a non-slip easy-grip surface which allows the device to be easily and comfortably grasped by a user through extended periods of use, and simultaneously serves to provide shock and impact protection for the device.

Preferably, the control panel comprises a control panel having a combination of special-purpose control buttons and a set of numerical buttons. Thus control of the operation of the device can be accomplished using the special purpose buttons and simple menu selections under suitable program control.

In an embodiment of the invention, the buttons of the control panel are formed of a single piece of resilient material. By this means, the device is protected from ingress of foreign material, such as dust and sand, through the control panel.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
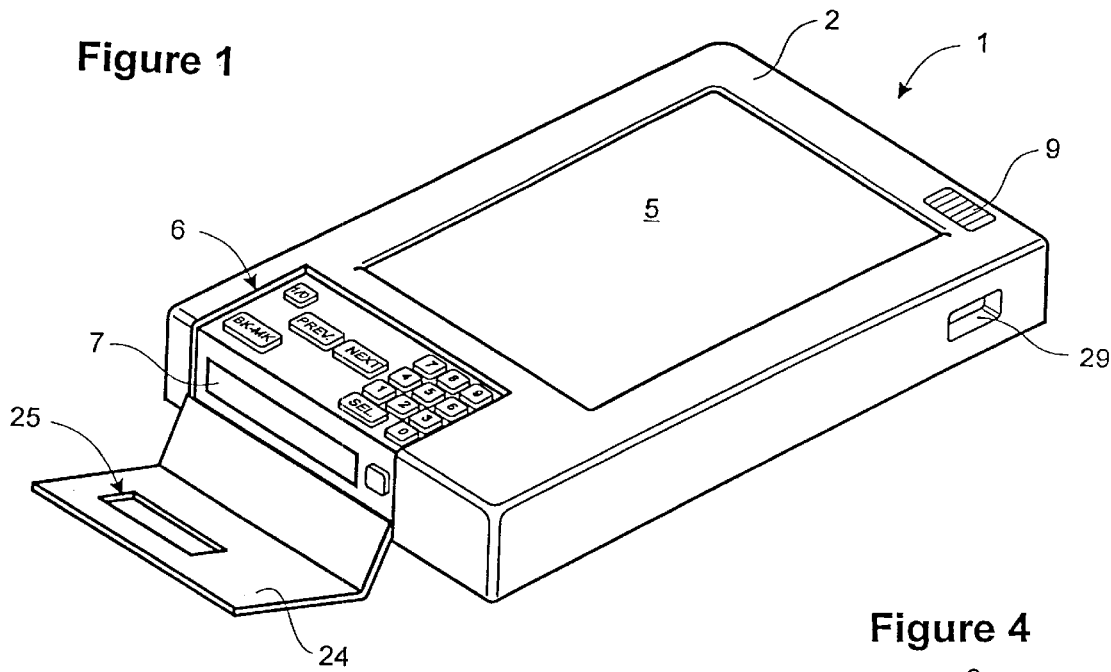
FIG. 1 is a perspective view showing a portable reading device in accordance with the present invention with the cover plate in an open position.

Referring to FIGS. 1–6, a portable reading device 1 in accordance with the present invention generally comprises a housing 2 within which there is installed a text information processing unit 3 including a microprocessor circuit 4, a display screen 5, a control panel 6, and a memory device 7.

The housing 2 provides a substantially rigid support and protective shield for the various components of the reading device 1. The housing 2 can conveniently be constructed of a suitable plastic material, such as, for example, Acrylonitrile Butadiene Styrene (ABS). ABS is a mixture of styrene plastic, acrylonitrile and butadiene rubbers. By varying the ratios of the amounts of each compound it is possible to obtain a composition that has desired properties of each. Thus ABS can be made to be opaque, impact resistant, and comparatively rigid. It is highly resistant to acids, alkalis, oil and petrol and can withstand temperatures of over 100° C. ABS also has high gloss and virtually unlimited colourability. ABS is commonly used in appliances, luggage shells, and is very common in computer and business machine housings.

Alternatively, the housing 2 can be constructed of metal (such as, for example aluminum or steel or alloys thereof) or of a combination of plastic and metal. The use of metal for at least a portion of the housing provides the advantage that the thermal conductivity of the metal can be exploited to assist in dissipating heat generated by electronic components installed within the housing.

Figure 6:
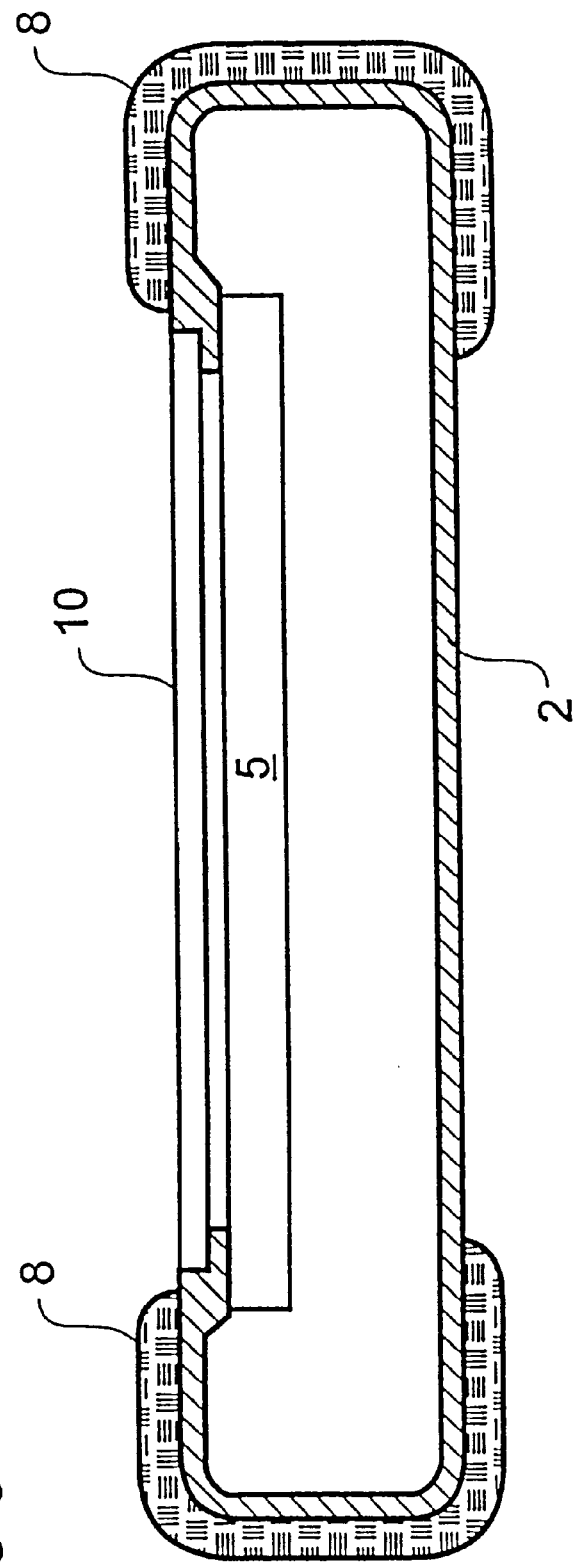
FIG. 6 is a partial cross-sectional view through of a portable reading device in accordance with the present invention.

At least a portion of the housing 2 is provided with at least one grip portion 8 designed to enhance the user's comfort during extended use of the device 1. The grip portion 8 is conveniently composed of a resilient, high-friction material affixed (for example by bonding or other suitable means) to the housing 2 at least along opposite sides of the device, as illustrated in FIG. 6. The grip portion 8 is preferably composed of a synthetic rubber material, such as for example, polychloroprene (trade name—Neoprene) or silicon rubber, both of which are resistant to chemical attack, and can be formulated during manufacture to provide desired characteristics of density, resilience and hardness. The thickness of the grip portion material can be varied as desired to ensure that the grip portions are suitably shaped to allow a good grip by the user, and so enhance comfort and usability of the device. In keeping with their thickness and resilience, the grip portions 8 also serve as bumpers, thereby providing the device with additional physical protection from impacts and shock.

Figure 3:
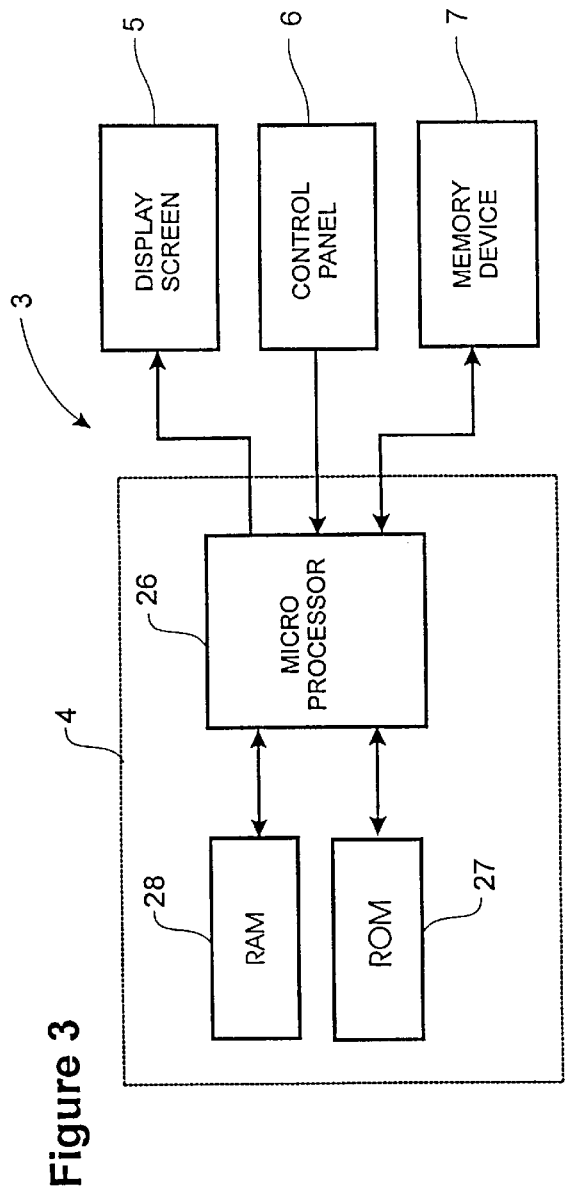
FIG. 3 is a block diagram illustrated the functional components of a portable reading device in accordance with the present invention.

Referring now to FIG. 3, the text information processing unit 3 generally comprises a memory device 7 for reading text information from a storage medium; a display screen 5 for displaying text information to be read by a user; a control panel 6 for receiving user input for control of the device 1; and a microprocessor circuit 4 for controlling the memory device 7 and display screen 5 in response to user input from the control panel 6 and in accordance with appropriate program control.

The memory device 7 is designed to read text information from a storage medium (not shown), so that the information can be displayed on the display screen 5. Various conventional systems can conveniently be utilized for this purpose, including memory cartridges, magnetic data storage devices such as conventional 3½ inch floppy diskettes, magneto-optical data storage devices, and Compact Disc Read Only Memory (CD-ROM) systems. Of these, CD-ROM systems provide a high degree of flexibility in terms of cost, high data storage density (so that large amounts of text can be stored on each disc), small size and physical robustness of the storage media. Accordingly, in the illustrated embodiment, the memory device 7 comprises a CD-ROM drive, into which can be inserted a conventional compact disc (not shown) having text information previously stored thereon. Advantageously, the memory device 7 can be a Micro-CD-ROM, which utilizes data storage disc that is significantly smaller than the more common 4.75 inch diameter compact disc. The use of a Micro-CD-ROM reduces the physical size of the memory device 7, and therefore contributes to reduced overall size of the reading device 1 as a whole.

The display screen 5 is used to display text and control menu information to be read by a user. Preferably, the display screen 5 will be provided as a conventional Liquid-Crystal Display (LCD) type of screen, such as, for example, an active-matrix monochrome Liquid-Crystal Display, which is capable of providing a clear, high-resolution image and good brightness control, while at the same time minimizing power consumption. The brightness of the display screen 5 can conveniently be controlled by either a user-activated controller switch (not shown), or automatically by using a photo-detector 9, or both.

The use of a color display screen is entirely possible. However, in view of the fact that the device 1 of the invention is intended to be utilized for reading text, it is anticipated that the use of a color LCD screen would yield little operational advantage, but would consume more power (and thus deplete the batteries faster) than a mono-chrome screen. Similarly, display technologies other than active-matrix LCD can be utilized. However, active matrix LCD is preferred in view of its ruggedness, high resolution (thereby creating a clearly readable image), and low power consumption (thereby prolonging battery life).

Conventional LCD screens are typically provided with internal back-lighting means for controlling screen brightness or illumination, as well as means for controlling contrast. Both of these functions can be controlled by the microprocessor 4 according to techniques well known in the art. In the illustrated embodiment, a photodetector 9 is disposed on the housing 2 and located so as to detect ambient lighting conditions. The signal generated by the photodetector can then be used to automatically control the illumination of the screen 5. As an alternative, or in addition, the illumination of the screen can be manually by means of a user-activated controller switch. The design and operation of the control circuitry required to implement manual and/or automatic illumination control functions are known in the art, and thus these features are not specifically illustrated and will not be described in further detail herein.

In order to protect the screen 5 from physical damage during use, a shield 10 composed of a clear, high-impact resistant plastic, such as, for example, Plexiglas (trademark) or Lexan (trademark), is provided above the display screen 5, as is shown in FIG. 6.

Figure 4:
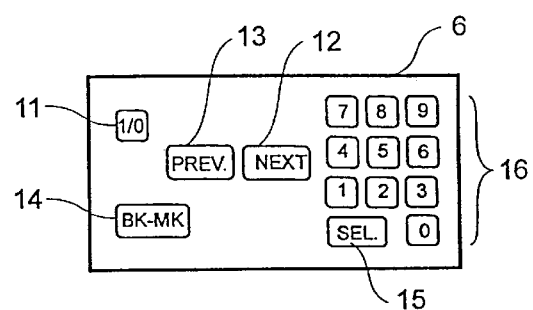
FIG. 4 appears on the same page as FIGS. 1 and 2, and illustrates the control panel of the embodiment of FIG. 1.

The control panel 6 is conveniently disposed in the upper face of the housing 2 to permit the user to control the retrieval and display of text information. As best shown in FIG. 4, the control panel comprises an "On/Off" button 11; a "Next Page" button 12; a "Previous Page" button 13; a "Bookmark" button 14; a "Select" button 15; and a set of numeric buttons 16 for entering numeric information. The operation of each of these buttons will be described in greater detail below.

Figure 5:
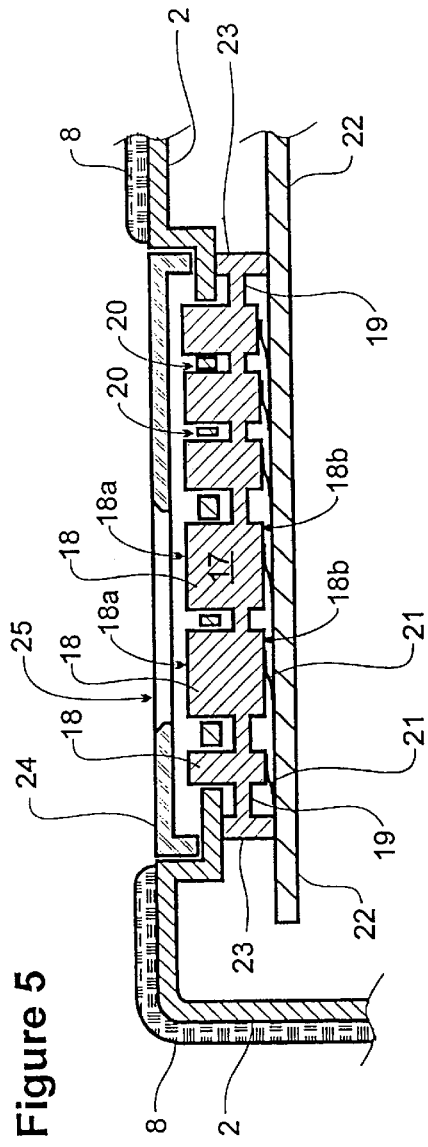
FIG. 5 is a partial cross-sectional view through the control panel of a portable reading device in accordance with the present invention.

As shown in FIG. 5, the buttons comprising the control panel are preferably formed together as a single sheet-like structure 17 composed of a resilient material such as synthetic rubber. Using this arrangement, the individual buttons are formed as studs 18 extending above-and below a common membrane 19. The top portion 18a of each stud 18 protrudes through a respective button hole 20 formed in the housing 2, and is conveniently colored and/or marked with suitable indicia to assist in user-recognition of the function of each respective button. When installed in the electronic reading device 1 of the invention, the base 18b of each stud contacts a respective "momentary contact" switch 21 mounted on a suitable substrate 22, so that the switch 21 will be closed when the user presses on the top of the respective stud 18. The resilience of the membrane 19 ensures that a depressed stud 18 will return to its original position (thus allowing the respective switch 21 to open) when the user stops pressing on the top of the stud 18. Conveniently, the membrane 19 can also be provided with a flange portion 23 extending around the perimeter of the membrane 19 and capable of forming a seal between the inside of the housing 2 and the substrate 22. This seal serves to protect the electronic reading device 1 from foreign matter such as sand and debris which might enter the housing 2 through the button holes 20.

Figure 2:
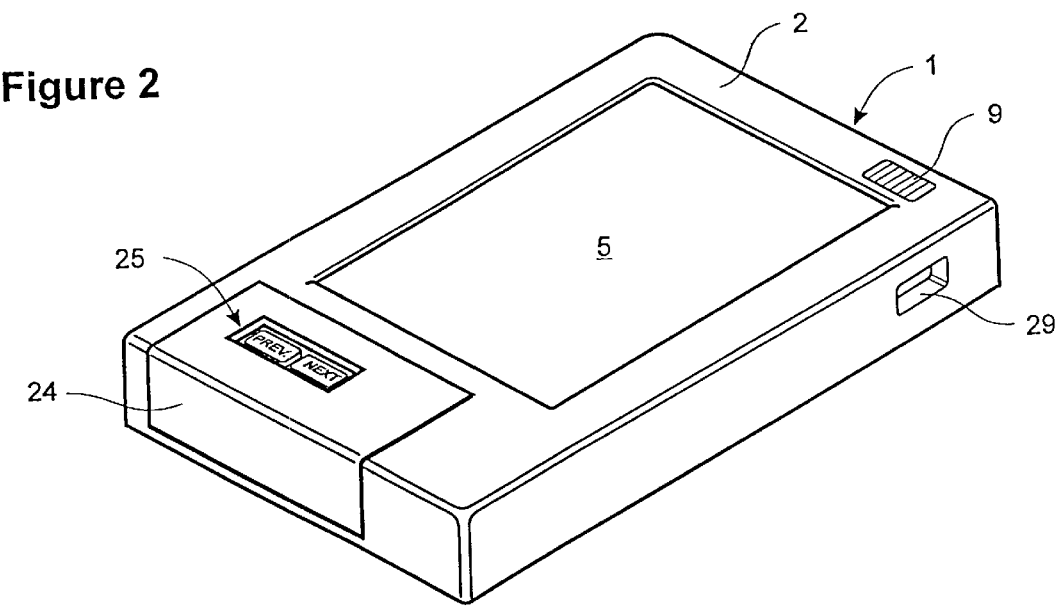
FIG. 2 is a perspective view showing the portable reading device of FIG. 1 with the cover plate in a closed position.

Referring to FIGS. 1, 2 and 5, further protection of the control panel 6, and the device 1 as a whole, is provided by a cover-plate 24 pivotably disposed over the control panel 6. As shown in FIGS. 1 and 2, the cover-plate 24 can be opened to expose all of the buttons for use, or can be closed to protect the control panel 6 from damage and to prevent buttons from being inadvertently pressed. However, the cover-plate 24 preferably includes a window portion 25 arranged so that, when the cover-plate 24 is closed, the user can press at least one of the buttons of the control panel. Preferably, the window 25 is positioned over the "Previous Page" 13 and "Next Page" 12 buttons, as shown in FIG. 2, thereby allowing a user to easily move between successive pages of text information on the screen 5, while keeping the remaining buttons of the control panel 6 concealed by the closed cover-plate 24.

In the illustrated embodiment, the cover plate 24 is arranged so that, when closed, it also covers the exposed face of the memory device 7. By this means, the cover plate 24 can be opened so that a data storage medium (such as a CD disc) can be easily inserted into the memory device 7. The user then utilizes the control panel 6 to retrieve and display desired text on the display screen 5. The cover plate 24 can then be closed, thereby preventing undesired operation of the control panel 6 and simultaneously protecting the memory device 7 from impacts and ingress of foreign matter.

The microprocessor circuit 4 generally comprises a conventional microprocessor 26 operatively coupled to each of the memory device 7, display screen 5, and the control panel 6. In addition, the microprocessor 26 is coupled to a read only memory (ROM), for example a conventional Erasable Programmable Read Only Memory (EPROM), within which is stored program information for controlling the operation of the device 1. A Random Access Memory 27 (RAM) is provided for temporary storage of text information for display, and control information concerning the operational status of the device. Conveniently, the RAM 27 can be provided as a Ferro-electric RAM (FRAM), which is capable of retaining stored information after the device 1 has been turned off. Accordingly, information concerning the operation of the device, and/or text information being displayed, is immediately available to the user when the device 1 is turned back on. As a further advantage, the FRAM does not require a constant supply of power to hold its memory, and thus does not deplete the power supply when the device 1 is not in use.

The memory device 7, display screen 5, and microprocessor circuit 4 can be conveniently powered by a conventional rechargeable battery pack (not shown), or an external power supply (not shown) connected to the reading device 1 through a suitable input jack 29. Preferably, the reading device 1 will incorporate both of these options, whereby the device 1 can be operated from its battery to provide maximum convenience and mobility. However, when the user desires, the device can be connected to an external power supply (not shown), and the power used to operate the device 1 and (optionally) simultaneously recharge the battery pack.

Using the above construction, the reading device 1 of the present invention can be successfully operated by a user in accordance with a suitable control program. Preferably, the device 1 will be programmed to perform at least the following functions.

When a storage medium (for example a Micro-CD) is inserted into the memory device 7, the microprocessor circuit 4 reads directory information describing the contents of the storage medium, and displays a menu of book or document titles stored on the storage medium. The user then selects a desired item using the numerical buttons 16 of the control panel 6, and presses the "select" button 15, in response to which the microprocessor circuit 4 retrieves from the storage medium control information specific to the selected book. The microprocessor circuit 4 then uses the control information to display a further menu by which the user can elect to start reading at any desired point in the book. Upon receipt of the user's input, the microprocessor circuit 4 retrieves the selected text information from the storage medium and displays same on the display screen 5 to be read by the user. Subsequently, the user can move to the next or previous pages of information by respectively pressing the "Next Page" 12 and "Previous Page" 13 buttons. If the user presses the "Select" button 15, the microprocessor circuit 4 displays an "options"-menu from which desired items can be selected using the numeric buttons 16.

When the user presses the "Bookmark" button 14, the microprocessor circuit 4 registers, in the RAM 28, "bookmark" information concerning the book or document being displayed and the user's position within the book or document. The user can then turn the device 1 off, and the "bookmark" information will be retained in the RAM 28. When the user subsequently turns the device back on, the user can immediately press the "Bookmark" button 14, in response to which the microprocessor circuit 4 automatically retrieves and displays the text information from the storage medium in accordance with the previously stored "bookmark" information.

It will be seen that the above-described and illustrated embodiment of the present invention can be varied without departing from the scope of the present invention. For example, in addition to illumination control, a "zoom" control can be provided to control the size of text displayed on the screen. In this case, a suitable control switch can be provided, for example on the control panel, for easy use by the user. Activation of the control switch by the user would cause the microprocessor 4 to calculate and store in RAM 28 a magnification factor. Thus during use, text would be retrieved by the memory device 7, sized in accordance with the magnification factor, and then displayed on the screen to be read by the user. This process can be continuous and dynamic, in that, when the zoom control is activated by the user, the text being displayed on the screen is actively resized and re-arranged on the screen, under suitable program control and substantially in "realtime" thereby allowing the user to easily select a desirable text size.

Furthermore, it will be seen that the cover plate can be designed to slide rather than pivot, as shown in the illustrated embodiment. Similarly, the window in the cover plate can be arranged to expose only a single key of the control panel, or several keys.

I claim:

1. A portable electronic text reading device for reading text information previously stored on a storage medium comprising:

a display screen for displaying text information of a document being read, and optionally system control data;

a control panel for receiving control inputs from a user;

a memory device for reading text information from a removable memory medium, for display on the monitor;

a microprocessor circuit responsive to control inputs from the control panel, for controlling the reading of text information from the memory medium, and for displaying read text information on the display screen;

a gripping portion comprising a resilient shock and impact absorbing material arranged to cover at least a portion of the housing, the gripping portion having a non-slip easy-grip surface for allowing the device to be easily and comfortably grasped by a user through extended periods of use, and simultaneously providing shock and impact protection for the device; and the housing being suitably designed to facilitate ease of use and comfort of the user over extended periods of use of the device, and further to effectively protect the display screen, control panel, memory device, and microprocessor circuit from damage due to impacts or ingress of foreign matter.

2. A portable electronic text reading device as defined in claim 1, wherein the display screen is provided with a brightness control whereby the user can adjust the brightness of the screen as desired.

3. A portable electronic text reading device as defined in claim 2, wherein the brightness control includes a photodetector circuit whereby the brightness of the screen can be automatically adjusted in accordance with ambient light conditions.

4. A portable electronic text reading device as defined in claim 1, further comprising a cover plate operatively disposed on the housing and movable between an open position wherein at least the control panel is exposed, and a closed position wherein the control panel is substantially covered, whereby, when the cover plate is in its closed position, the cover plate serves to afford physical protection to the control panel, and further prevents the user from inadvertently activating the control panel while the device is in use.

5. A portable electronic text reading device as defined in claim 4, wherein the cover plate includes a window portion, whereby when the cover plate is in its closed position, at least one button of the control panel is exposed.

6. A portable electronic text reading device as defined in claim 5, wherein the window portion is positioned in the cover plate such that a "Next Page" button of the control panel is exposed and can be activated by the user when the cover plate is in the closed position.

7. A portable electronic text reading device as defined in claim 4, wherein the cover plate is further capable of covering at least a portion of the memory device, such that the cover plate can be opened to facilitate insertion of a memory medium into the memory device, and then the cover plate can be subsequently closed to provide physical protection to the memory device and to prevent ingress of foreign matter.

8. A portable electronic text reading device as defined in claim 4, wherein the cover plate is pivotably attached to the housing, such that the cover plate is movable between open and closed positions by pivoting.

9. A portable electronic text reading device as defined in claim 4, wherein the cover plate is slidably attached to the housing, such that the cover plate is movable between open and closed positions by sliding.

10. A portable electronic text reading device as defined in claim 4, wherein the cover plate is designed to cover only the control panel, whereby when the cover plate is in its closed position, the control panel is substantially covered while the display screen remains substantially exposed.

11. A portable electronic text reading device as defined in claim 1, wherein the control panel comprises a plurality of special-purpose control buttons and a plurality of numerical buttons, whereby a user can control the operation of the device using the special purpose and numerical buttons, and menu selections displayed on the display screen under suitable program control.

12. A portable electronic text reading device as defined in claim 11, wherein the buttons of the control panel are formed of a single piece of resilient material including a flange portion forming a seal with an interior wall of the housing, whereby the device is protected from ingress of foreign matter through the control panel.

* * * * *

UNITED STATES PATENT AND TRADEMARK OFFICE
CERTIFICATE OF CORRECTION

PATENT NO. : 6,037,954
DATED : March 14, 2000
INVENTOR(S) : McMahon

Page 1 of 1

It is certified that error appears in the above-identified patent and that said Letters Patent is hereby corrected as shown below:

Claim 1 is corrected as follows:

1. A portable electronic text reading device for reading text information previously stored on a storage medium, comprising :
a display screen for displaying text information of a document being read, and optionally system control data;
a memory device for reading text information from the storage medium, for display on the display screen;
a microprossor circuit responive to control inputs from the control panel, for controlling the reading of text information from the storage medium, and for displaying read text information on the display screen;
a gripping portion comprising a resilient shock and impact absorbing material arranged to cover at least a portion of a housing, the gripping portion having a non-slip easy –grip surface for allowing the device to be easily and comfortably grasped by a user through extended periods of use, and simutaneously providing shock and impact portection for the device; and the housing bieng suitably designed to facilitate ease of use and comfort of the user over extended periods of use of the device, and further to effectively protect the display screen, control panel, memory device, and microprocessor circuit from damage due to impacts or ingress of foreign matter.

Signed and Sealed this

Fourth Day of September, 2001

*Attest:*

NICHOLAS P. GODICI
*Attesting Officer*    Acting Director of the United States Patent and Trademark Office

UNITED STATES PATENT AND TRADEMARK OFFICE
CERTIFICATE OF CORRECTION

PATENT NO. : 6,037,954
DATED : March 14, 2000
INVENTOR(S) : M. James McMahon

It is certified that error appears in the above-identified patent and that said Letters Patent is hereby corrected as shown below:

Claim 1 is corrected as follows,
1. A portable electronic text reading device for reading text information previously strored on a storage medium, comprising:
a display screen for displaying text information of a document being read, and optionally system control data;
a control panel for receiving control inputs from a user;
a memory device for reading text information from [a removable memory] the storage medium, for display on the [monitor] display screen;
a microprocessor circuit responsive to control inputs from
the control panel, for controlling the reading of text
information from the [memory]storage medium, and for displaying read text information on the display screen;
a gripping portion comprising a resilient shock and impact absorbing material arranged to cover at least a portion of [the] a housing, the gripping portion having a nonslip easy-grip surface for allowing the device to be easily and comfortably grasped by a user through extended periods of use, and simultaneously providing shock and impact protection for the device; and
the housing being suitably designed to facilitate ease of use and comfort of the user over extednded periods of use of the device, and further to effectively protect the display screen, control panel, memory device, and microprocessor circuit from damage due to impacts or ingress of foreign matter.

Signed and Sealed this

Fourth Day of December, 2001

*Attest:*

*Attesting Officer*

NICHOLAS P. GODICI
*Acting Director of the United States Patent and Trademark Office*